Sept. 7, 1943.  C. T. JACOBS  2,329,119
CONTROL SYSTEM
Filed July 5, 1940
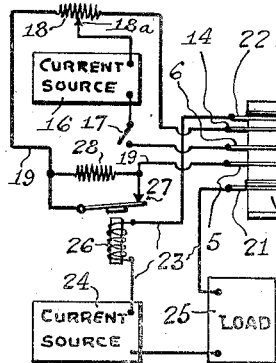
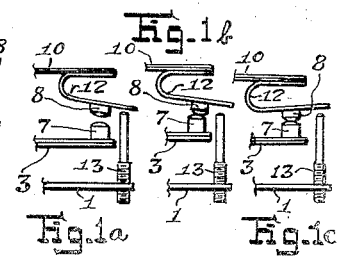
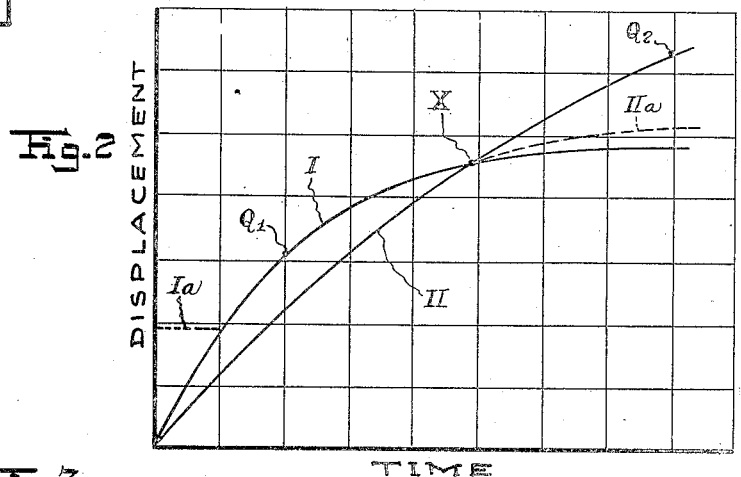
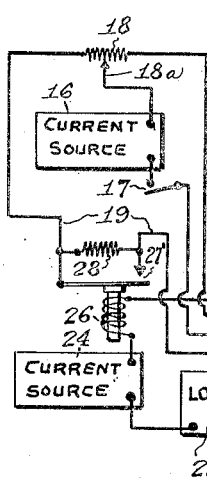
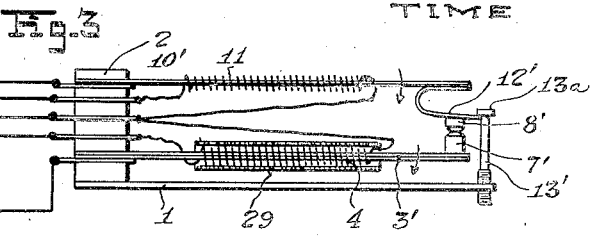
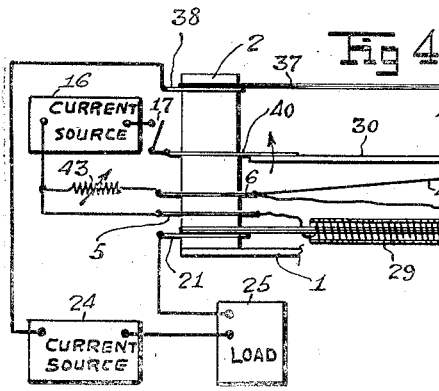
Inventor
Charles T. Jacobs
By Henry Canahan
Attorney Patented Sept. 7, 1943

2,329,119

UNITED STATES PATENT OFFICE 2,329,119

CONTROL SYSTEM

Charles T. Jacobs, New Providence, N. J., assignor to Thomas A. Edison, Incorporated, West Orange, N. J., a corporation of New Jersey Application July 5, 1940, Serial No. 344,006

22 Claims. (Cl. 175—320)

This invention relates to control systems, and in its principal aspect to such systems of the time-delay type—e. g., adapted to perform or complete a controlling function at the expiration of an interval of delay following an initial energization or manipulation of the system.

A well known general type of such system is one wherein energy is supplied to energy-storing means, the system performing its controlling function in accordance with, or dependence on, the level of energy in the storing means. A typical example of such a storing means is a thermally movable element which acts to store the heat energy supplied thereto less any heat losses therefrom. Ordinarily the delay interval characterizing such a system is sharply dependent on the rate of the energy supply. An object of the instant invention is to provide a time-delay control system characterized by a delay interval substantially independent of material variations in the rate of energy supply.

In a more specific aspect, the storing means in such a system may be an electro-thermal device, the energy supply to the system being in the form of an electric current. Ordinarily the delay interval characterizing such a system is dependent on the square of the voltage at which the current is supplied—for example, the voltage of a power line or battery from which the system is operated. An object of the instant invention is to provide an electro-thermal time-delay control system characterized by a delay interval substantially independent of material variations in the voltage of the source from which the system is operated.

Other objects are the provision of improvements, for systems of the general types described, rendering those systems operable with time-delay intervals substantially independent of material variations in rate of energy supply, or in voltage of the operating source.

It is an object, in providing such improvements, to maintain the system substantially independent of the ambient temperature to which the system is exposed; and it is a particular object to achieve these joint results while maintaining the system relatively simple.

Still another object is to provide, in systems fulfilling already-stated objects, simple means for effecting desired alterations or adjustments of the time-delay interval, without impairing the substantial independencies above set forth.

It is another object to provide, for systems of the general type above set forth, improved time-delay relays specially adapted to the objects stated for the systems.

Other and allied objects will more fully appear from the following description and the appended claims.

In the description reference is had to the accompanying drawing, in which:

Figure 1 is an elevational view of a relay, and a schematic view of typical further components which with the relay make up a control system, embodying the invention in one typical form, the parts being illustrated in their ambient-temperature positions;

Figures 1a, 1b and 1c are fractional views of the relay of Figure 1 in different stages of the operation of the system;

Figure 2 is a group of curves illustrating certain typical displacements of elements of the relay of Figure 1, plotted against time;

Figure 3 is a view of similar nature to Figure 1 but illustrating the embodiment of my invention in a modified form, the parts being illustrated in their ambient-temperature positions;

Figure 4 is a view of similar nature to Figure 1 but illustrating the embodiment of my invention in a further modified form, the parts being illustrated in their ambient-temperature positions; and Figures 4a, 4b and 4c are fractional views of the relay of Figure 4 in different stages of the operation of the system.

Reference being had to Figure 1, there will be seen a base 1, at the lefthand end of which is secured the stack 2 of insulating blocks. In the stack 2 there is clamped the lefthand extremity of a bimetallic arm 3, which as usual may be formed of two metals of dissimilar thermal coefficients of expansion. It will be understood that this element will bend arcuately as its temperature is raised, and in the embodiment of Figure 1 this bending is intended to be upward at the free extremity of the arm, as illustrated by the arrow therethrough. Broadly, of course, this arm is an energy-storing, or more specifically a thermal, device, adapted to move in accordance with changes of its energy content or temperature. When the arm is at a temperature above the ambient temperature, a downward change of its temperature of course tends to occur by virtue of heat losses (radiation, convection, conduction) from the arm. As a typical means for effecting an upward change of energy content or temperature, there has been illustrated as wound about the arm 3 a heater winding 4 through which an electric current may be passed. The terminals of the winding 4 may be conveniently connected to lugs 5 and 6 provided in the stack 2 above the arm 3.

The bimetallic arm 3 is employed to impart a moving influence to one of two control members which together form a control means to be operated. In the embodiment of Figure 1 the control means may comprise a pair of contacts 7 and 8, which normally (e. g., when the bimetallic arm 3 is at ambient temperature) are intended to be out of contact with each other, and which are intended to close against each other to effect or complete an operation of the control means. Contact 7 may be carried on top of the righthand extremity of the bimetallic arm 3. Contact 8 may be carried, above contact 7, by a second bimetallic arm 10—below its righthand extremity and otherwise in manner hereinafter more specifically described—the lefthand extremity of the bimetallic arm 10 being clamped in the stack 2 above the lugs abovementioned. It will be understood that the bimetallic arm 10 will bend arcuately as its temperature is raised, and in this embodiment this bending with rising temperature is intended to be upward (i. e., similar to that of arm 3), as indicated by the arrow therethrough.

The bimetallic arms 3 and 10 may be arranged to have a similar displacement-per-degree-temperature-change. It will therefore be understood that variations in the ambient temperature will be without influence on the spacing between the righthand extremities of the two arms. And the structure as so far described, assuming the contacts 7 and 8 normally spaced from each other, will be recognized as a simple well-known type of ambient-compensated relay which, when current is supplied to the winding 4, would operate its control means 7—8 (i. e., close them against each other) at the expiration of the delay interval required for bimetallic arm 3 to move contact 7 upwardly to touch contact 8. The delay interval in such operation would, however, be necessarily markedly dependent on the current supplied to the winding 4, or to the voltage at which that current was supplied.

According to my invention, I supply energy not only to the storing device constituted by the bimetallic arm 3, but also concomitantly and proportionately to the device constituted by the bimetallic arm 10. These devices are arranged, relatively to each other, so that the resulting movement of the bimetallic arm 10 is relatively rapid initially but is for a relatively limited distance, while the resulting movement of the bimetallic arm 3 is relatively less rapid initially but is for a relatively less limited distance. The control members 7 and 8 are arranged so that they tend to move with the respective bimetallic arms. They are further preferably arranged so that normally they tend to occupy substantially the relationship to each other which is intended to be effected by, or at the completion of, the operation of the system (e. g., in the embodiment of Figure 1, they are preferably so arranged that they normally tend to approximately touch each other with negligible pressure). This last specification—which, if rigorously met without any counteractive, would destroy the utility of the system for many purposes—may be met with a sufficient degree of latitude to avoid the members normally fully occupying the mutual relationship intended to be effected by system operation (e. g., in the embodiment of Figure 1, the contacts may be arranged to be normally at the smallest spacing from each other which will dependably insure their non-touching); or the specification may be more rigorously met, and a positive counteracting means provided which is normally effective to prevent the obedience of the members to the stated tendency, but which is of no effect on the actual operation of the system (i. e., at the expiration of the delay interval).

In Figure 1 there will be seen a heater winding 11 provided about the bimetallic arm 10; as will hereinafter appear, current may be supplied to this winding coincidentally and proportionately with the supply of current to the winding 4 on the bimetallic arm 3. The control member or contact 8 may be carried by the bimetallic arm 10 through the medium of a light leaf spring 12; by way of example this has been shown as having one extremity secured against the bottom of the righthand extremity of the bimetallic arm 10, as curving leftwardly and downwardly therefrom and then rightwardly, and as having the contact 8 secured to the bottom of its lower portion. As indicated by the dotted lines in Figure 1, the spring 12 may be adjusted so that the contact 8 normally tends just to touch contact 7; but a positive counteracting means normally effective to prevent this contact may be provided in the form of a vertical screw 13 adjustably secured in the base 1 and passing upwardly therefrom so that its top extremity is impinged on by the bottom of spring 12 to the right of the contact 8. This screw may be adjusted so that it holds contact 8 dependably spaced from contact 7 when the bimetallic arms 3 and 10 are at ambient temperature, against the force of spring 12 tending to bring them just into contact with each other; operation of the system, however, carries the arm 10 and spring 12 and contact 8 upwardly out of the zone of influence of the screw 13, which is therefore entirely ineffective at the completion of operation of the system. It may here be noted that any adjustment of screw 13 will be effective, for the intended simple function of this screw, over a wide range of ambient temperatures—though very wide ambient temperature variations might occasion some necessity for a re-adjustment. Even this unusual necessity may be eliminated by making the base 1 a bimetallic arm, of similar displacement-per-degree-temperature-change to that of the bimetallic arm 10 (and thus to that of the bimetallic arm 3), so that the relationships of those arms to the top of the screw 13 will never be changed by ambient temperature variations.

In best understanding the operation of the system, upon the concomitant supply of currents to the windings 4 and 11 of the electro-thermal devices 3—4 and 10—11, it is convenient to resort to a simple approximate mathematical representation of the spacing $S_t$ tending to exist between the contacts (e. g., 7 and 8) at $t$ seconds after the beginning of an operation of the system. Such a representation is readily arrived at on the approximately correct assumption that the losses from each device increase in direct proportion to the excess of its temperature over ambient temperature; and on the corollary that when energy is supplied to the device at a uniform rate (as by steady current flow through its heater winding) the displacement of the device (e. g., reckoned at its associated contact) from initial position, plotted against time, is an exponential function which asymptotically approaches some limiting or "saturation" displacement D. If $e$ be taken as the base of natural or Naperian logarithms, if P be taken as a constant (explained below) for each storing or electro-thermal device, and if the subscripts 1 and 2 be taken as an identification, of the quantities to which they are appended, with the devices 10—11 and 3—4 respectively, then (assuming ambient temperatures of the elements and zero contact separation when $t$ equals zero):

$$S_t = D_1(1-e^{-tP_1}) - D_2(1-e^{-tP_2}) \qquad (1)$$

It may be shown that for each device:

$$P = F/C = 1/Q \qquad (2)$$

when F is a constant expressing the heat-transfer or cooling facility of the device, C is a constant expressing the thermal capacity (or mass times specific heat) of the device, and Q is the reciprocal of P, or the so-called "time constant," expressing the time required for the device to reach approximately 63% of the saturation displacement. It may also be shown that for each device:

$$D = EK/F \qquad (3)$$

when E represents the rate of energy input to the device (for example, watts input to its winding), K is a constant expressing the displacement-per-degree-temperature-change, and F is as defined above. (1) may therefore be rewritten as:

$$S_t = \frac{E_1 K_1}{F_1}(1-e^{-tF_1/C_1}) - \frac{E_2 K_2}{F_2}(1-e^{-tF_2/C_2}) \qquad (4)$$

When $t$ is zero, both the terms of the righthand side of Expression (4) are zero, and $S_t$ is obviously zero, as was postulated. But it may be shown that $S_t$ will also be zero—representing contact closure—at some finite value of $t$, provided:

$$\frac{\frac{E_2 K_2}{C_2}}{\frac{E_1 K_1}{C_1}} < 1 < \frac{\frac{E_2 K_2}{F_2}}{\frac{E_1 K_1}{F_1}} \qquad (5)$$

$EK/F$ has been seen to represent saturation displacement, and it may be shown that $EK/C$ represents initial displacement rate. Thus (5) is a mathematical statement of the condition that the saturation displacement of the bimetallic arm 10 be less than that of the bimetallic arm 3, but that the initial displacement rate of the bimetallic arm 10 be greater than that of the bimetallic arm 3. These are the relative characteristics of the electro-thermal devices set forth above.

Expression (5) may be rewritten in any of a variety of forms, still expressing the identical condition. For example, it may be rewritten as:

$$\frac{C_1}{C_2} < \frac{E_1 K_1}{E_2 K_2} < \frac{F_1}{F_2} \qquad (5a)$$

This states the condition in the language that the ratio of the energy inputs multiplied by the respective displacements-per-degree) shall be larger than the ratio of the thermal capacities but smaller than the ratio of the heat-transfer facilities—which two latter ratios will be understood to be related to each other in the proportion $Q_1:Q_2$.

Again, Expression (5) may be rewritten as:

$$1 < \frac{\frac{E_1 K_1}{C_1}}{\frac{E_2 K_2}{C_2}} < \frac{Q_2}{Q_1} \qquad (5b)$$

This states the condition in the language that the initial displacement rate of the first device shall be greater than—i. e., a multiple of—that of the second, while the time constant of the second shall be a still greater multiple of that of the first.

A mathematical solution of Expression (4), for the finite value of $t$ at which the expression becomes zero, is complicated. It is readily possible, however, to plot against time the values of each of its two righthand terms, with typical values meeting the conditions of (5). This has been done in Figure 2, wherein I is the curve of the first of those terms (representing upward displacement of 10—11) and II the curve of the second of those terms (representing upward displacement of 3—4). By way of typical example, these curves have been plotted for values which, substituted in either Expression (5) or (5a), cause that to become $$\tfrac{1}{2} < 1 < 2 \qquad (6)$$

The time constants for the two curves, which are in the ratio of the first term to the third term in (5) or (5a)—i. e., in the typical example, in the ratio of 1:4—have been noted on the respective curves as $Q_1$ and $Q_2$.

Throughout that time range through which curve I is above curve II, the contacts will be open from each other; to denote the effect of screw 13 to urge the contact 8 away from contact 7 normally and during the early part of the operation, there has been shown the dotted horizontal curve portion Ia intended for substitution for the portion of curve I therebelow. At the point X of intersection of the curves the contact spacing will have been reduced to zero and the contacts thus closed, the system thus having been operated with the delay interval measured by the abscissa of the point X.

It will be understood, from the exponential appearance of F and C in Expression (4) above, that variations, proportionate or otherwise, in the values of these constants (and thus of P and Q) for the respective devices would affect the delay interval characterizing the operation of the system. It will also be appreciated that ordinary variations of E for the two devices would affect that interval. But a proportionate variation in the values of E for the two devices— i. e., a proportionate variation of $E_1$ and $E_2$— cannot affect the finite value of $t$ at which $S_t$ becomes zero (i. e., the delay interval), since both terms of the expression are only proportionately influenced. (The same is true for the values of K for the two devices, which values, however, will preferably be identically predetermined for ambient-temperature compensation, as above noted). Graphically, or in terms of Figure 2, a proportionate variation of $E_1$ and $E_2$ simply multiplies each ordinate of each curve by a common factor, without alteration of the abscissa of their point of intersection X.

This independence of the delay interval from influence by any proportionate changes of the energy inputs results in freedom of that interval from the influence of wide variations in the voltage of any common source from which current may be supplied to the two electro-thermal devices 3—4 and 10—11.

It may be noted that if the contact separation $S_t$ in (1) or (4) above were to include not only the time-variable terms but also a fixed term— representing an initial contact separation, or deviation from just-touching tendency, which acted as a point of reference for the time-variable terms (as distinguished from a wholly temporary initial separation, effected as by screw 13)

—the independence above discussed would be impaired, to an extent dependent on the amount of that fixed term. For it, being fixed, would preclude that proportionate variation of all terms, on which the independence is predicated. It will be understood, however, that even though such a fixed term or deviation be present, my invention will be useful to reduce the degree of delay interval variation with energy supply variations, and no unnecessary limitation to substantially the ideal case is intended.

With any given control system it may frequently be desirable to deliberately alter the delay interval. The most common method of doing this with a simple thermal relay—an alteration of the initial separation of the contacts—is not fundamentally desirable with a system according to the instant invention, for reasons quite apparent from the immediately preceding text. A method which is preferably employed, and which does not disturb the desired normal adjustment of the control members so that they tend to occupy substantially that mutual relationship into which the operation of the system is intended to bring them, is the non-proportionate variation of the energy inputs to the two devices (e. g., 10—11 and 3—4). Such a variation must be carried out within the limits permitted by the condition expressed in (5) or (5a) above. In other words, in varying the ratio of $E_1$ to $E_2$, the ratio $E_1K_1/E_2K_2$ must be kept greater than $C_1/C_2$ and less than $F_1/F_2$; but since the ratio or "spread" between the latter two quantities is equal to the ratio between the time constants, which latter may be very widely different, a large range of adjustment is readily provided.

In Figure 1 the winding 4 has already been stated to be connected between the lugs 5 and 6; the winding 11 may be connected between lug 6 and a lug 14 thereabove in stack 2. A common source of current—whose voltage may fluctuate widely without significant effect on the delay interval, as has already been made apparent—has been shown for the two windings as 16. By way of example one terminal of this source is shown connected to the common lug 6 through a normally open switch 17 whose closure starts the operation of the system. The other terminal of the source 16 may be connected to the lugs 5 and 14 through respective variable resistances, for the non-proportionate variation of currents to the two windings, abovementioned. A typical arrangement of these resistances provides for an increase in the value of one simultaneous with a decrease in the value of the other, and vice versa; and this arrangement may be carried out by connecting the outer terminals of a potentiometer 18 to the lugs 5 and 14 (through respective conductors 19 and 20), and connecting the source 16 to a contact 18a continuously variable along the potentiometer resistance.

Graphically, or in terms of Figure 2, it will be understood that variation of the contact 18a to the right will serve to multiply all the ordinates of curve I by a factor greater than unity, and to multiply all the ordinates of curve II by a factor less than unity—and vice versa. Obviously such variations serve to alter the abscissa of the point X of curve intersection, and hence the delay interval characterizing the system.

The closure of the contacts 7 and 8 may be utilized in any desired manner and for any desired purpose. By way of example I have shown them connected, through the respective bimetallic arms 3 and 10, respective lugs 21 and 22, and conductors 23, into a series circuit with a source of current 24 and a load 25, to control the flow of current from that source through that load. And no unexpressed limitation is intended as to the functions of the system subsequent to operation or closure of the control members 7—8 and prior to re-opening of the switch 17. There may be mentioned, however, as an example of a possibly desired function, the continued supply of load 25 with current from source 24 throughout the continued closure of switch 17. Under these circumstances it may be desirable to reduce the rate of current supply to the winding 4, which now needs to do little more than overcome losses in order to maintain the bimetallic arm 3 in position to continue the closure of 7 against 8, to a value somewhat less than initially employed for raising that arm. This may for example be done by inserting in one of the conductors 23 the winding of a relay 26, which upon energization by closure of the circuit 21—22—23—24—25 will open a switch 27 normally short-circuiting a resistance 28 inserted in the conductor 19.

In Figure 2 there has been included a dotted curve portion IIa, intended for substitution for the portion of curve II thereabove, showing the typical effect of such a current-reducing expedient on the displacement of arm 3. Since the excess height of curve II over surve I in this region to the right of point X is a measure of the degree to which spring 12 will be flexed after closure of contacts 7 and 8, it will be seen that this or any equivalent expedient may be employed greatly to reduce the degree of that flexure.

While the operation of the system of Figure 1 has been disclosed both mathematically and graphically, there have been included in the drawing the fractional Figures 1a, 1b and 1c illustrating the approximate positions of the contacts and arm extremities (a) at a time when the "advance" device 10—11 has undergone a major portion, and the "main" device 3—4 a smaller portion, of their respective upward movements; (b) at the time the contacts have just been closed (corresponding to the point X in Figure 2); and (c) at a time during the cooling of the system after opening of switch 17. In general, the advance device 10—11, having a more rapid initial displacement rate on heating, will have a more rapid initial displacement rate on cooling. This will occasion a closer approach of the bimetallic arms 10 and 3 to each other during cooling than normally or during heating, with an attendant flexure of spring 12, and may cause a longer "hang-over" closure of contacts 7 and 8 against each other (after opening of switch 12) than in the case of a simple relay with a motive element of the time constant of either 3 or 10. For most purposes this will be of no consequences; if in any particular case it is considered serious, however, its effect may be avoided in various ways, a typical one of which is disclosed in connection with a later-described embodiment of the invention.

There has been brought out above the necessity for a significantly different time constant for the two storing or electro-thermal devices, as well as the dependence of time constant both on heat-transfer facility (F) and on thermal capacity (C). While the two devices may have respective time constants differentiated from each other wholly by a difference in respect of either of these two parameters, I have illustrated in Figure 1 some variation in respect of each. Thus the thermal capacity of the device 3—4 has been made larger than that of the device 10—11, by the employment of a relatively larger mass in the bimetallic arm 3 than in the bimetallic arm 10; while at the same time the heat-transfer facility of the device 3—4 has been made less than that of the device 10—11, by the use of thermal insulation 29 about the major portion of the device including the winding 4. This thermal insulation may be of any desired type, either effective primarily for convection or primarily for radiation or partially for both. In addition, if desired, the heat-transfer facility of the device 10—11 may be increased by painting it black to promote radiation, or by other appropriate expedients.

There is intended no unexpressed limitation to a control means comprising control members in the form of contacts to be closed against each other at the expiration of the delay interval. By way of example of other control means, I show in Figure 3 control members intended to be opened from each other at the expiration of such an interval. The structure illustrated in this figure may be basically similar to that of Figure 1, with the differences that the advance device, comprising bimetallic arm 10' carrying contact 8' through the medium of spring 12' in general analogy to the Figure 1 construction, moves downwardly with increasing temperature; that the main device, comprising bimetallic arm 3' carrying contact 7' in general analogy to the prior construction, also moves downwardly with increasing temperature; that the normal-conditioning screw 13' is extended upwardly past the end of spring 12' to carry a washer-like flange 13a overhanging the end of the spring to form an up- instead of a down-stop therefor; and that, if the final current-reducing means 26—28 be employed, its resistance-shorting switch 27' be arranged as a switch closed by the normal passage of current through the circuit 21—22—23—24—25, and opened in response to the cessation of that current caused by the opening of contacts 7' and 8' at the expiration of the delay interval. Spring 12' is preferably so adjusted that contacts 7' and 8' tend normally to be substantially in just-opening condition; positive touching at this time is insured by a sufficiently low adjustment of the screw 13', imparting a distending flexure to spring 12'.

Upon the joint supply of current to the two devices 3'—4 and 10'—11', arm 10' will move downwardly at a relatively more rapid initial rate, but for a relatively more limited distance, than does arm 3'. Accordingly during the delay interval spring 12' (after losing any initial distending flexure) will be considerably flexed compressively, and the contacts will remain touching each other. But at the expiration of that interval spring 12' will just have been restored to its normal or free configuration (now being of course free of any touching by 13a); and contact 8', now moving downwardly more rapidly than contact 7', will move away from the latter—opening the circuit 21—22—23—24—25, and causing the reduction of current to winding 4 if the final current-reducing means 26—28 has been employed. The action is quite fairly depicted by the curves I and II of Figure 2, the ordinates now representing downward displacement, and the excess height of curve I over curve II now representing closure of the contacts with flexure of spring 12'. The considerations governing the relative values of the parameters of the advance and main devices remain as above set forth for the earlier embodiment; and, like the system of that embodiment; the system of Figure 3 will operate with an interval of delay which is essentially independent of wide variations in the voltage of the common source 16, but which is readily adjusted as by the movement of the contact 18a on potentiometer 18.

In Figure 4 I show an embodiment of my invention modified from previous embodiments in several respects. The control members appear as contact 7, carried by bimetallic arm 3 on which is provided heater winding 4 as in Figure 1, and contact 8, carried on spring 12 as in Figure 1— the device which carries spring 12 being an electro-thermal device which may if desired take a form specifically different from 10—11 of Figure 1, and which has been illustrated in Figure 4 and will be described below. By way of example, it is contemplated that the contacts 7 and 8 are to be closed against each other at the expiration of the delay interval, as in the case of Figure 1; and preferably they will be arranged normally to approximately just touch each other, as illustrated in Figure 4.

As was pointed out in connection with earlier embodiments, while it is desirable that the control members normally tend to be established in that mutual relationship whose establishment is to occur at the expiration of the delay interval, it is usually undesirable that they normally be effectively so established. The means which normally prevented an effective such establishment in the embodiments of Figures 1 and 3 was a mechanical one (e. g., screw 13) which prevented the actual such establishment normally. I may, however, employ other means for the broad function of normally preventing the effective such establishment of the control members, in the form of circuit means which render the actual such establishment electrically ineffective. Such means I have illustrated in Figure 4.

Thus there may be secured to the top of the righthand extremity of the arm 30 (forming a part of the upper or "advance" electro-thermal device and hereinafter described), to the bottom of which spring 12 is secured, a light leaf spring 31; the spring may curve, from its secured extremity, first leftwardly and then upwardly and then rightwardly, to carry a contact 32 on top of its upper portion. The springs 31 and 12 (and therethrough the contacts 32 and 8) may be electrically connected together, but are preferably jointly insulated from the arm 30. This may be done by interposing strips 33 of insulation between the respective springs and arm 30; by passing insulating bushings 34 through the assembly of springs, strips and arm; and by passing through the bushings rivets 35, the heads of which may be peened over into electrical as well as mechanical contact with the springs. Above the contact 32 there is carried a contact 36, on the bottom of the righthand extremity of a bimetallic arm 37 whose lefthand extremity is clamped in the top of stack 2 in contact with a lug 38. The bimetallic arm 37 may be responsive simply to ambient temperature, and may have an upward displacement-per-degree-temperature-rise similar to that of the electro-thermal device of which arm 30 forms a part.

Contacts 32 and 36 are arranged so that as long as the system is at ambient temperature they are separated from each other by a substantial fraction of the upward displacement which the contacts 8 and 32 will undergo during operation of the system. Electrical connection to the control member or contact 8 is made through the medium of lug 38 and bimetallic arm 37 and contacts 32 and 36. Therefore contact 8 will normally be out of circuit, or electrically ineffective, but is brought into circuit and rendered effective at an intermediate point of time in the operation of the system, so as to be fully effective at the expiration of the delay interval. Of course the adjustment of normal spacing between the contacts 32 and 36 will set a lower limit to the permissible degree of variation of operating displacement of contact 8 (e. g., of source voltage variation), but dependable normal opening of contacts 32 and 36 from each other is readily achieved without precluding a very wide permissible such variation.

The displacements - per - degree - temperature-change of the bimetallic arm 37 and of the advance device in which arm 30 is included, already mentioned as preferably similar to each other and upward with temperature rise, are preferably similar to that of the main device 3—4.

The fractional Figures 4a, 4b and 4c illustrate typical approximate positions of the contacts and arm extremities (a) at a time when the advance device (in which arm 30 is included) has just undergone that upward displacement which brings contacts 32 and 36 together, the main device 3—4 having undergone a relatively smaller upward displacement; (b) at the time when the contacts 7 and 8 have just been closed against each other (i. e., at the expiration of the delay interval), spring 31 now having been somewhat compressively flexed; and (c) at a time during the cooling of the system after the cessation of the controlling current supply, spring 12 now being compressively flexed, in view of the more rapid cooling of the advance device than of the main device. It may be noted, as an advantage of the Figure-4 embodiment for certain purposes, that after the cessation of controlling current supply the circuit through the control members 7—8 is broken (at contacts 32—36) quickly, or under the control of the relatively short time constant of the advance device.

There is of course intended no limitation of the features of difference of Figure 4 from earlier figures to the case of control members comprising contacts to be closed against each other at the expiration of the delay interval, this case simply having been chosen for illustrative purposes.

The alternative form of advance device illustrated in Figure 4 comprises a simple metal arm 30 substantially rigid within itself, effectively hinged to the stack 2 through the medium of leaf spring 40 to which its lefthand extremity is secured and which imparts an upward biasing force to the arm 30 as illustrated by the arrow therethrough; and a thin wire 41 stretched from a lug 42 on the bottom of the arm 30 near spring 12 leftwardly and slightly downwardly to a lug (for example, 6) in the stack. The wire 41 of course forms the means which retains arm 30 in normal position against the upward biasing force abovementioned. The wire 41 is adapted to be heated by an electric current—most simply, by the passage of that current through the wire—and to be elongated by its resulting temperature rise. In view of the arrangement of the elements, this elongation is translated into an upward movement of the arm 30; and if the angle formed between wire 41 and arm 30 is relatively small, as shown, the upward arm movement will be almost strictly proportionate with, or linear with respect to, the wire elongation. The wire elongation with heating, and the corollary contraction with cooling, follow a generally similar law to that above discussed for other forms of electro-thermal devices; consequently so does the entire advance device, comprising the wire and the arm 30, in respect of its upward movement of the contacts 8 and 32. The constants $F_1$ and $C_1$ (and thus $P_1$ and $Q_1$) of the wire, and a constant $K_1$ representing the wire elongation-per-degree-temperature rise multiplied by a factor (depending on the geometry of wire and arm) to refer it to arm movement at the contacts, become the constants of the electro-thermal device 30—41.

The relationship of the $K_1$ of this device to $K_2$ of the main device 3—4, and to the displacement constant of the bimetallic arm 37, has been pointed out to be preferably one of identity. The other constants of and the energy input ($E_1$) to the wire 41, relative to the constants of and input to the device 3—4, may be apportioned according to the principles explained for the earlier embodiments. It may be pointed out, however, that the wire 41 has such an extremely small thermal capacity ($C_1$) that the ratio $C_1/C_2$ will tend to become a very small fraction of the ratio $F_1/F_2$; in other words, the time constant ($Q_1$) of the advance device will tend to be a particularly small fraction of that ($Q_2$) of the main device. In terms of Figure 2, the curve I (in order to represent the displacement of the device 30—41) would rise much more nearly vertically, and become essentially flat at a considerably lower abscissa or value of $t$; the intersection X of the two curves, and thus the expiration of the delay interval, would occur when the device 30—41 was substantially at its saturation displacement. This tends to result, even with adjustments for relatively short delay intervals, in a substantial angle of intersection between the curves, which is advantageous for greatest dependability of action. The wide difference between the time constants of course makes available an especially wide range of timing adjustment—in other words, $E_1K_1/E_2K_2$ may be widely varied without disobeying the condition (5a) above.

While an external circuit arrangement similar to that of Figure 1 may be employed, I have by way of alternative illustration shown the current source 16 connected, through switch 17, between lug 5 and spring 40, to pass current serially through the wire 41 and heater winding 4; for timing adjustment purposes the relative wattages in 41 and 4 may for example be adjusted by variation of a variable resistance 43 shunted across the winding 4 (between lugs 5 and 6). The controlled source 24 and load 25 may of course be serially connected between lugs 21 and 38.

It will be understood that while I have disclosed various features of my invention variously grouped in the different embodiments, I intend thereby no unnecessary limitations, for these features may obviously be widely interchanged between the several embodiments.

In a broad aspect it will be seen that I have provided a pair of displaceable devices, for example energy-storing or electro-thermal devices, whose constants are related in manners above detailed, and a control means responsive to the differential displacement of the devices. And it has been seen that with this combination I may further employ a means which suspends the effective operation of the control means until after an initial period in the supply of energy or heat to the devices (e. g., either screw 13 in Figure 1, or the supplementary switch 32—36 in Figure 4).

From the point of view of the control members, it will be seen that two member-moving influences are produced (e. g., in Figure 1, by heating of 10—11, to influence 8; and by heating of 3—4, to influence 7), these influences being mutually opposite in respect of relative control-member movement—e. g., that produced by 10—11 is in a direction to separate the control members, while that produced by 3—4 is in a direction to bring the control members together.

It will be understood that while I have particularly described the operation of the system in terms of logarithmic displacement action of the devices, this action is of course approximate rather than rigorous—though such deviations as there are from rigorous nature, because they apply to both devices and for other reasons, are of very small impairing effect on the ultimate beneficial functions. It will thus be understood that in referring to approximately logarithmic displacement in certain of the appended claims, I intend to embrace a substantial range of deviation from utterly rigorous action.

It will be obvious to those skilled in the art that many modifications may be made from the embodiments specifically illustrated and described, and that such modifications will not necessarily constitute a departure from the true spirit or scope of the invention. That scope I undertake to express in the appended claims.

I claim:

1. The method of operating a control means which consists in effecting two independent displacements each varying approximately logarithmically with time, the time constant of one of said displacements being a fraction of that of the other and the limiting value asymptotically approached by said one displacement being a larger fraction of that asymptotically approached by the other, and utilizing the differential between said displacements to influence the control means.

2. The method of operating a control means which consists in effecting two independent displacements each varying approximately logarithmically with time, the time constant of one of said displacements being a fraction of that of the other, utilizing the differential between said displacements to influence the control means, and controlling the ratio of the limiting value asymptotically approached by said one displacement to that asymptotically approached by the other within the limits respectively constituted by said fraction and by unity.

3. In an electrical control system, in combination, a pair of energy-storing devices each approximately logarithmically displaced by a constant supply of energy thereto, the time constant of the second of said devices being a multiple of that of the first; energy-supplying means effective on both devices for displacing said devices at respective initial rates of which that for the first device is a smaller multiple of that for the second; and control means operated by said devices in accordance with their differential displacement.

4. In an electrical control system, in combination, a pair of energy-storing devices each approximately logarithmically displaced by a constant supply of energy thereto, the time constant of the second of said devices being a multiple of that of the first; energy-supplying means effective on both devices; control means operated by said devices in accordance with their differential displacement; and means for controlling the ratio between the initial displacement rate of the first device and that of the second between the limits respectively constituted by said multiple and by unity.

5. In an electrical control system, in combination, a pair of electro-thermal devices each displaceable by current supply thereto, the time constant of the second of said devices being a multiple of that of the first; current-supplying means effective on both devices for displacing said devices at respective initial rates of which that for the first device is a smaller multiple of that for the second; and control means operated by said devices in accordance with their differential displacement.

6. In an electrical control system, in combination, control means comprising coacting control members; and two electro-thermal means respectively associated with said control members to move the same, the saturation displacement of one of said electro-thermal means being a fraction of that of the other, and the time constant of said one means being a still smaller fraction of that of the other.

7. In an electrical control system, in combination, control means comprising coacting control members; electro-thermal means energizable to impart to one of said control members a relatively rapid but limited-distance moving influence; and electro-thermal means simultaneously energizable to impart to one of said control members a relatively slower but less-limited-distance moving influence opposite to said first influence in respect of relative member movement.

8. In an electrical control system, in combination, control means comprising coacting control members and operable by the establishment of said members in a predetermined mutual relationship, said members normally tending to assume substantially that relationship; and approximately logarithmically acting moving means, operatively connected with and influencing said control means, energizable to impart thereto a relatively rapid but limited-distance relative member-moving influence, and also to impart thereto a relatively slower but less-limited-distance relative member-moving influence opposite to said first influence in respect of relative member movement, whereby to re-establish said predetermined mutual relationship at the expiration of an interval substantially independent of material variations in the degree of moving-means energization.

9. The combination according to claim 8, further including means for suspending the effective operation of said control means until after an initial period in the energization of said moving means.

10. The combination according to claim 8, further including means for maintaining said control members out of said predetermined mutual relationship until after an initial period in the energization of said moving means.

11. The combination according to claim 8, further including means for differentially varying said moving influences, whereby to alter the length of said interval.

12. In an electrical control system, in combination, a pair of relatively movable contacts normally tending approximately to just touch each other; electrothermal means energizable to impart to one of said contacts a relatively rapid but limited-distance moving influence; and electrothermal means simultaneously energizable to impart to one of said contacts a relatively slower but less-limited-distance moving influence opposite to said first influence in respect of relative contact movement.

13. The combination according to claim 12, further including means, effective when said electro-thermal means are at ambient temperature, for opposing the tendency of said contacts to just touch each other.

14. The combination according to claim 12, further including a supplementary switch in circuit with said contacts and responsive to one of said electro-thermal means.

15. In an electrical control system, in combination, a pair of coacting contacts; a pair of bimetallic arms respectively carrying said contacts, the time constant of the second of said arms being a multiple of that of the first; and heating means, associated with and effective on said arms, for displacing said arms at respective initial rates of which that for the first of said arms is a smaller multiple of that for the second.

16. In an electrical control system, in combination, a pair of energy-storing devices each approximately logarithmically displaced by a constant supply of energy thereto; energy-supplying means for rapidly displacing one of said devices substantially to a saturation displacement; energy-supplying means simultaneously operable to more slowly displace the other of said devices toward a greater saturation displacement; and control means operated by said devices in accordance with their differential displacement.

17. In an electrical control system, in combination, a pair of electro-thermal devices each displaceable by current supply thereto; current-supplying means for rapidly displacing one of said devices substantially to a saturation displacement; current-supplying means simultaneously operable to more slowly displace the other of said devices toward a greater saturation displacement; and control means operated by said devices in accordance with their differential displacement.

18. In an electrical control system including relatively movable control members and operable by the establishment of said members in a particular mutual relationship: the combination of an electro-thermal device energizable to effect a relatively slow displacement of one of said members for operation of the system; and an electro-thermal device energizable to effect a relatively rapid displacement of one of said members, toward a saturation value less than that of the first-mentioned displacement, and in direction opposite to the first-mentioned displacement in respect of relative member movement.

19. The combination according to claim 18, wherein said members are adjusted to normally tend to assume substantially said particular mutual relationship, and further including means for suspending the operation of the system until after said devices have been energized.

20. The combination according to claim 18, wherein said members are adjusted to normally tend to assume substantially said particular mutual relationship, and further including means for maintaining said members out of said relationship in the absence of energization of said devices.

21. In an electrical control system including relatively movable control members and operable by the establishment of said members in a particular mutual relationship: the combination of an electro-thermal device electrically energizable to move one of said members for operation of the system; and a distinct electro-thermal device electrically energizable to establish, in accordance with voltage at which current is supplied to the system, the distance through which said last-mentioned member must be moved to establish said relationship.

22. In an electrical control system including relatively movable control members and operable by the establishment of said members in a particular mutual relationship: the combination of an electro-thermal device energizable to move one of said members for operation of the system; and distinct electro-thermal means, also electrically energizable and effective after an initial period in the energization of said device, to render dependent on the voltage of current supply to the system the distance through which said last-mentioned member must be moved to establish said relationship.

CHARLES T. JACOBS.